United States Patent [19]

Zabrocki et al.

[11] Patent Number: 4,920,178

[45] Date of Patent: Apr. 24, 1990

[54] SEEDED EMULSION POLYMERIZATION OF α-METHYLSTYRENE AND ACRYLONITRILE

[75] Inventors: Karl Zabrocki, Buettgen; Christian Lindner, Cologne; Otto Koch, Cologne; Hans-Eberhard Braese, Cologne, all of Fed. Rep. of Germany

[73] Assignee: Bayer Aktiengesellschaft, Leverkusen, Fed. Rep. of Germany

[21] Appl. No.: 312,725

[22] Filed: Feb. 21, 1989

[30] Foreign Application Priority Data

Mar. 5, 1988 [DE] Fed. Rep. of Germany ....... 3807233

[51] Int. Cl.$^5$ ................................ C08F 2/26
[52] U.S. Cl. .................................... 525/262; 525/243; 526/213; 526/216; 526/342; 526/233; 526/234
[58] Field of Search ............... 526/210, 213, 216, 342, 526/911; 525/238, 262, 243

[56] References Cited

U.S. PATENT DOCUMENTS

| 3,732,336 | 5/1973 | Duke et al. ..................... 526/342 X |
| 4,294,946 | 10/1981 | Minematsu et al. ............ 526/342 X |
| 4,427,832 | 1/1984 | Yagi et al. ....................... 526/342 X |
| 4,755,576 | 7/1988 | Zabrocki et al. ................. 526/342 |

FOREIGN PATENT DOCUMENTS 0042572 12/1981 European Pat. Off. ............ 526/342

*Primary Examiner*—Joseph L. Schofer
*Assistant Examiner*—F. M. Teskin
*Attorney, Agent, or Firm*—Connolly and Hutz

[57] ABSTRACT

An α-methylstyrene/acrylonitrile copolymer obtainable by emulsion polymerization which, in combination with other polymers, particularly PVC, enables alloys of outstanding thermal stability and color stability to be produced and, in addition, has a high heat distortion temperature and shows good fogging behavior and which is obtained by radically initiated inflow copolymerization of a mixture of 30 to 32 parts by weight acrylonitrile and 68 to 70 parts by weight α-methylstyrene in the presence of an emulsifier containing carboxyl groups. The polymerization is conducted in such a way that a seed latex of the same copolymer or of an analogous copolymer is introduced before addition of the monomers is commenced, the reaction temperature is kept between 75° and 82° C. and the molar ratio of emulsifier to initiator is between 4 and 6.

4 Claims, No Drawings

SEEDED EMULSION POLYMERIZATION OF α-METHYLSTYRENE AND ACRYLONITRILE

Copolymers of α-methylstyrene and acrylonitrile, hereinafter also referred to as AMS resins, are used as thermoplastic mixing components in ABS plastics and various blends.

It is known from US-PS 3,644,577 that the properties of polyvinyl chloride (PVC) can be modified towards higher heat resistance, improved processibility and lower permeability to gases by the addition of AMS resins.

EP-A-0 042 106 describes similar polymer mixtures which additionally contain graft polymers having a certain chemical structure. In this case, the AMS copolymer is produced in emulsion and is spray-dried as a latex mixture with the graft system. PVC thus modified can be used for hot water drainage pipes.

However, standard AMS copolymers blended with PVC show a tendency towards thermal degradation and discoloration which makes these blands unsuitable for many applications. Accordingly, attempts have been made to modify the structure of the AMS resin by special reaction conditions in such a way that this disadvantage is eliminated.

Thus, US-PS 3,491,071 describes a suspension process in which the polymerization of the two monomers takes place under pressure and is followed by degassing to remove residual monomers. On account of the considerable effort involved, this process is inferior to conventional emulsion polymerization.

The same applies to the bulk or suspension polymerization described in EP 0 107 795 in which, in addition, very special difunctional peroxides that are difficult to obtain have to be used.

EP-A-0 044 097 describes an emulsion polymerization process for the production of AMS resins in which a heat-resistant copolymer is formed by specific temperature management. However, this material shows a tendency towards thermal discoloration, particularly in combination with PVC.

EP-A-0 041 703 describes a polymerization process in which products substantially free from residual monomers can be obtained with minimal thermal discoloration by maintaining certain concentrations of acrylonitrile in the reaction mixture. However, these products show only moderate toughness in combination with other polymers, for example graft rubbers, surface defects being formed at relatively high processing temperatures.

DE-OS 31 28 370 describes the production of color stable, heat-resistant AMS resins in which the molar ratio of α-methylstyrene to acrylonitrile is kept at 1.3:1 to 3.0:1 up to a conversion of 90%. The polymerization stops at around 97% so that large quantities of residual monomers remain behind, adversely affecting the heat resistance of mixtures. In addition, these resins give off considerable quantities of evaporation products under thermal stressing, as demonstrated by the fogging test according to DIN Draft 75 201 or provisional ISO Standard 6452.

DE-OS 34 31 194 describes an emulsion polymerization process for the production of AMS resins, in which fully polymerized products with little or no tendency towards discoloration, particularly in ABS systems, can be obtained by maintaining certain monomer ratios via the conversion. However, the thermal stability of these materials is not high enough for use in PVC.

It has now been found that it is possible by a special emulsion polymerization process to obtain an AMS resin which, in combination with other polymers, particularly PVC, gives alloys having outstanding thermal and color stability and, in addition, has a high heat distortion temperature and shows good fogging behavior.

The AMS resin according to the invention is obtained by the radically initiated inflow copolymerization of a mixture of 30 to 32 parts by weight acrylonitrile and 68 to 70 parts by weight α-methylstyrene in the presence of an emulsifier containing carboxyl groups, the polymerization being conducted in such a way that a seed latex of the same copolymer or of an analogous copolymer is initially introduced before addition of the monomers is commenced, the reaction temperature is kept between 75° and 82° C. and the molar ratio of emulsifier to initiator is between 4 and 6.

The AMS resin thus produced preferably has molecular weights of $5 \times 10^4$ to $5 \times 10^5$ and, more preferably, in the range from $10^5$ to $2 \times 10^5$ (viscosimetric determination in accordance with Angew. Makromol Chemie 2 (1969), pages 16 to 34).

In principle, any known emulsion polymerization process may be used for the production of the copolymers according to the inventio. The following procedure has proved to be particularly favorable:

An aqueous solution is initially introduced into a stirred reactor in a quantity of 150 to 300% by weight (based on the quantity of monomers to be polymerized); it contains the emulsifier system, the seed latex and, optionally, a regulator. After this aqueous solution has been heated to the polymerization temperature of 75° to 82° C., the initiator is added, the monomer mixture is then introduced over a period of 4 to 7 hours, more initiator is optionally added and the mixture is left to react. The resin latex obtained is coagulated in known manner, washed, dried and further processed as a thermoplast, optionally after mixing with more polymer latices and optionally after the addition of additives.

Suitable emulsifiers are anionic emulsifiers containing carboxyl groups, for example resin soaps, fatty acid soaps and alkali salts of synthetic surface-active carboxylic acids; of these, resin soaps, i.e. disproportionated and isomerized abietic acid derivatives, are particularly preferred.

The initiators used are water-soluble systems, for example persulfates and perphosphates. Particularly preferred initiators are persulfates of which potassium peroxodisulfate produces the most favorable product properties.

The molecular weight regulators used are organosulfur compounds, of which long-chain mercaptans, for example n- and tert.-dodecyl mercaptan, are preferred. The regulators are best dissolved in the monomer mixture.

The emulsifiers, initiators and regulators may also be initially introduced in the aqueous solution or may even be separately added as further feeds over the duration of polymerization.

According to the invention, the reaction temperature must be in the range from 75° to 82° C., its exact position within this range being determined by the technical possibilities for dissipating the heat of polymerization. Temperatures below 75° C. slow down the reaction too much while at temperatures above 82° C. the desired molecular weights are not reached and the final conversion decreases. In order to obtain both a high molecular weight and also a minimal residual monomer content, it has proved to be best to keep the temperature relatively low, for example at a constant 77° C., over about three quarters of the monomer addition time and to increase it, for example to 80° C., in the last quarter and in the following period in which the reaction is completed. Where the temperature is managed in this way, it should not exceed 82° C. Final conversions of more than 97% and generally of more than 98% are achieved in this way.

Maintaining these conditions is critical to the quality of the AMS resin produced.

According to the invention, a seed latex which, preferably, has also been produced in accordance with the invention is introduced into the aqueous polymerization medium. The quantity of seed latex comprises 0.1 to 3.5% by weight and preferably 1.0 to 2.0% by weight (solid/solid) of the total quantity of AMS resin to be produced. Copolymers in which the α-methylstyrene is completely or partly replaced by styrene may also be used as the seed latex.

Seed latices in which the mean particle diameter of the polymer particles, as measured by turbidity measurement, is below 110 nm are particularly preferred.

In general, 0.2 to 1.0% by weight and preferably 0.3 to 0.8% by weight initiator and 1.5 to 3.0% by weight and preferably 2.0 to 2.8% by weight emulsifier (quantities based on 100 parts by weight of the resulting AMS resin) are used for polymerization. The type and quantity of these two components are selected in such a way that a molar ratio of emulsifier to initiator of 4 to 6 is obtained. This molar ratio is crucially important to the technical quality of the AMS resins over and above the known parameters of emulsion polymerization. If the molar ratio remains below the value indicated, the polymerization becomes too slow, high conversions are not achieved and the product discolors under thermal stressing. If the ratio is exceeded, the fogging value increases considerably.

The AMS resin emulsions obtained in accordance with the invention may be further processed by known methods. For example, they may be coagulated, washed, dewatered and dried, optionally after addition of such additives as stabilizers, antioxidants, antiagers, either on their own or after mixing with other latices, for example graft rubbers, so that powder-form materials are obtained. These powders may be blended with other polymers, particularly PVC and plasticizers, by conventional mixing techniques, for example in screws, kneaders and calenders, optionally in the presence of standard additives, such as pigments, lubricants, antistatic agents and auxiliaries, such as fillers and reinforcing materials. The compounds thus obtained may be processed into films or injection-molded for example by known methods.

EXAMPLES AND COMPARISON EXAMPLES

The Examples and Comparison Examples are intended to show that the required combination of technical properties is only achieved within the teaching according to the invention. All quantities are in parts by weight. The final conversion was determined by gravimetric analysis. The fogging value was determined in accordance with DIN 75 201 (Draft), the Vicat value in accordance with DIN 53 460, method B, heating rate 50° C./minute. To this end, the AMS resin was compounded with 0.4 part by weight of a lubricant (Loxiol G 70) on mixing rolls at 190° C. and drawn out into a sheet.

EXAMPLE

The following constituents were introduced into a reactor:
3868 parts deionized water
42 parts resin soap as emulsifier
42 parts 1N sodium hydroxide
119 parts of an AMS resin latex (seed latex)
After heating to 80° C., a solution of
7.7 parts potassium persulfate in
300 parts deionized water
was added with stirring.
A mixture of
1625 parts α-methylstyrene,
731 parts acrylonitrile and
1.8 parts tert.-dodecyl mercaptan
was added over a period of 5 hours with continuous stirring. On completion of the addition, an aqueous solution of 1 part potassium peroxodisulfate was added, followed by stirring for 4 hours at 80° to 82° C.

After cooling, the latex is stabilized and precipitated in the usual way with a salt solution. A powder-form polymer is obtained after washing and drying and may be processed in known manner into plastic alloys.

In the Comparison Examples, the procedure described above was modified as shown in Table 1 which also shows the product properties.

TABLE 1

| | Example 1 | Comparison Examples | | | | | | | |
| --- | --- | --- | --- | --- | --- | --- | --- | --- | --- |
| | | a | b | c | d | e | f | g | h |
| Emulsifier (parts) | 42 | 30 | 42 | 42 | 42 | 58.9 | 70.7 | 82.5 | 42 |
| Seed latex, solids (parts) | 42.8 | 42.8 | — | 42.8 | 42.8 | 42.7 | 42.7 | 42.7 | 42.7 |
| Acrylonitrile (parts) | — | — | — | 22 | — | — | — | — | — |
| AMS (parts) | 1625 | → | → | → | → | 1615 | → | → | → |
| ACN (parts) | 731 | → | → | 709 | 800 | 722 | → | → | → |
| Reaction temperature | 80° C. | → | 70° C. | 80° C. | 80° C. | 80° C. | 80° C. | 80° C. | 85° C. |
| Molar ratio of emulsifier to initiator | 4.53 | 3.24 | 4.53 | 4.53 | 4.53 | 6.45 | 7.75 | 9.00 | 4.53 |
| Final conversion (%) | 98.6 | 95.5 | 99.2 | 99.4 | 93.9 | 97.4 | 98.3 | 92.8 | 86.4 |
| Fogging value DIN 75201 (Draft) | 94 | 0 | 0 | 0 | not tested | 91 | 90 | 90 | 0 |
| Vicat value VSTB/50 | 116 | 115 | 117 | 113 | not tested | 103 | 106 | 98 | 93 |

AMS = α-methylstyrene
ACN = acrylonitrile

We claim:

1. A process for the production of copolymer which comprises the polymerisation of from 30 to 32 parts by weight, of acrylonitrile and from 68 to 70 parts, by weight, of α-methyl-styrene, the monomers being introduced into a seed latex comprising an (α-methyl)-styrene/acrylonitrile copolymer and the polymerization being effected in the presence of a radical water-soluble initiator and a carboxyl group-containing emulsifier at a temperature of from 75° to 82° C., such that the molar ratio of emulsifier:initiator is from 4:1 to 6:1.

2. A process as claimed in claim 1 wherein from 0.1 to 3.5%, by weight, solid/solid based on the copolymer product, of seed latex is used.

3. A process as claimed in claim 1, wherein from 0.2 to 1.0%, by weight, based on 100 parts, by weight, of the copolymer product, of initiator is used.

4. A process as claimed in claim 1, wherein from 2.0 to 2.8%, by weight, based on 100 parts, by weight, of the copolymer product, of emulsifier is used.

* * * * *